(12) United States Patent
Koyagi et al.

(10) Patent No.: US 7,197,944 B2
(45) Date of Patent: Apr. 3, 2007

(54) HUB UNIT WITH SENSOR

(75) Inventors: Katsura Koyagi, Kashiwara (JP); Masahiro Inoue, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 51 days.

(21) Appl. No.: 10/540,889

(22) PCT Filed: Dec. 26, 2003

(86) PCT No.: PCT/JP03/16922

§ 371 (c)(1),
(2), (4) Date: Jun. 27, 2005

(87) PCT Pub. No.: WO2004/059273

PCT Pub. Date: Jul. 15, 2004

(65) Prior Publication Data

US 2006/0075833 A1 Apr. 13, 2006

(30) Foreign Application Priority Data

Dec. 26, 2002 (JP) .............................. 2002-375959

(51) Int. Cl.
*G01L 3/14* (2006.01)
(52) U.S. Cl. ................................. 73/862.322
(58) Field of Classification Search ............ 73/862.322
See application file for complete search history.

(56) References Cited

U.S. PATENT DOCUMENTS

| | | | | |
|---|---|---|---|---|
| 3,431,525 | A * | 3/1969 | Buntschuh et al. | 336/123 |
| 4,701,651 | A * | 10/1987 | Tanaka | 310/90 |
| 4,960,333 | A * | 10/1990 | Faye et al. | 384/448 |
| 6,098,469 | A | 8/2000 | Nicot | |
| 6,161,962 | A * | 12/2000 | French et al. | 384/459 |
| 6,802,208 | B2 * | 10/2004 | Chinitz et al. | 73/118.1 |
| 6,830,379 | B2 * | 12/2004 | Morita et al. | 384/448 |
| 6,856,061 | B2 * | 2/2005 | Nishizawa et al. | 310/162 |
| 6,989,618 | B2 * | 1/2006 | Fukuyama et al. | 310/90 |

FOREIGN PATENT DOCUMENTS

| | | |
|---|---|---|
| JP | 33334/1990 | 3/1990 |
| JP | 35666/1994 | 5/1994 |
| JP | 11-118521 | 4/1999 |
| JP | 2004-3918 | 1/2004 |

* cited by examiner

*Primary Examiner*—Edward Lefkowitz
*Assistant Examiner*—Octavia Davis
(74) *Attorney, Agent, or Firm*—Oblon, Spivak, McClelland, Maier & Neustadt, P.C.

(57) ABSTRACT

A sensor device including a resolver having a rotor provided on a rotation-side raceway member of a hub unit and a stator provided on a stationary-side raceway member of the unit, and a processing circuit for processing a signal to be output in accordance with an air gap between the stator and the rotor. The processing circuit has a wheel ground contact load calculating unit for determining the ground contact load on a wheel from the air gap between the stator and the rotor.

12 Claims, 4 Drawing Sheets

HUB UNIT WITH SENSOR

BACKGROUND ART

The present invention relates to sensor-equipped hub units comprising a hub unit serving as a component of a motor vehicle and a sensor device joined to the hub unit for detecting various items of data as to the motor vehicle.

Since various items of data are required for controlling motor vehicles, it has been proposed to provide a sensor on a hub unit comprising a rotation-side raceway member to which a wheel is to be attached, a body-side raceway member to be fixed to the vehicle body, and two rows of rolling bodies arranged between the two raceway members.

For example, the publication of JP-A No. 3-209016 discloses a sensor-equipped hub unit wherein an annular support member is attached to the inner end face of a body-side raceway member and provided with a strain sensor.

In recent years, the control means in use for motor vehicles include drive force control means not permitting spinning of the drive wheels when the vehicle is started or accelerated, and braking force control means for suppressing lateral skidding for cornering, in addition to the ABS control means (antilock brake system). To ensure more accurate control, it has become important to detect data which is usable effectively for these modes of control.

In view of the above situation, the present inventor has conceived the idea of improving the control of vehicles by accurately measuring the ground contact load acting on the tire.

However, since the conventional sensor-equipped hub unit described above is adapted to measure the strain of the annular support member, the ground contact load determined from the strain involves a great error, hence the problem that accurate values of ground contact load are not available from the measurements of the strain sensor.

An object of the present invention is to provide a hub unit having a sensor and adapted to measure ground contact loads with high accuracy.

DISCLOSURE OF THE INVENTION

The present invention provides a sensor-equipped hub unit comprising a hub unit having a rotation-side raceway member to be provided with a wheel, a stationary-side raceway member to be fixed to a vehicle body and rolling bodies arranged between the two raceway members, and a sensor device mounted on the hub unit, the sensor-equipped hub unit being characterized in that the sensor device comprises a resolver composed of a rotor provided on the rotation-side raceway member and a stator provided on the stationary side raceway member, and a processing circuit for processing a signal to be output in accordance with an air gap between the stator and the rotor, the processing circuit having a wheel ground contact load calculating unit for determining the ground contact load on the wheel from the air gap between the stator and the rotor.

With speed variations of running vehicles or alterations in the posture thereof, the ground contact load on each tire varies, and the displacement of the axle relative to the vehicle body varies with the magnitude of the ground contact load. The displacement of the axle is in corresponding relation with the displacement of the rotation-side raceway member relative to the stationary-side raceway member in the hub unit, i.e., to the air gap between the stator and the rotor. Accordingly, by determining the relationship between the ground contact load on the tire and the displacement of the rotation-side raceway member in advance, and measuring the air gap between the stator and the rotor by the resolver, the ground contact load can be calculated from the ground contact load-displacement relational expression and from the air gap with high accuracy.

The principle of detecting the angle of rotation by the resolver is known. When the rotation-side raceway member and the stationary-side raceway member rotate relative to each other with sinusoidal voltage applied to the stator, the air gap between the stator and the rotor varies for the stator to produce a voltage in accordance with the angle of rotation, whereby the state of rotation of the hub unit can be detected.

With the sensor-equipped hub unit of the invention, the resolver detects the displacement of the rotation-side raceway member relative to the stationary raceway member. Since the displacement is in corresponding relation with the ground contact load, the ground contact load can be calculated accurately from the displacement obtained. The ground contact load on the tire thus obtained is used as substitute data for the slip ratio in ABS control and also for drive force control or braking force control, thus contributing to improvements in controlling vehicles. The resolver itself detects rotation and therefore provides also data as to rotation along with ground contact loads, with the result that the rotation of the wheel and the ground contact load on the tire, which are important parameter for controlling vehicles, are available by one sensor.

The stator of the resolver comprises, for example, an annular core having a saw-toothed inner periphery, and a stator winding formed by providing coils respectively on all teeth of the core. The stator is fixed to the inner periphery of the stationary-side raceway member by a press fit, with inner ends of teeth of the core facing radially inward. The rotor of the resolver is provided, for example, by machining the rotation-side raceway member at a portion thereof opposed to the stator for use as a rotor. In this case, the rotor is, for example, in the form of a cylindrical surface which is eccentric with respect to other outer peripheral surface of the rotation-side raceway member, or in the form of a cylindrical surface having a cutout at a required portion along the circumference. The rotor may be provided alternatively by fittingly fixing an annular magnetic body having a cylindrical inner peripheral surface and a noncylindrical outer peripheral surface to the rotation-side raceway member at a portion thereof opposed to the stator.

The resolver may be provided at an end portion of the hub unit, or at an intermediate portion between two rows of rolling bodies. In the former case, the stator is forced into an end portion of the rotation-side raceway member by a press fit, and the rotor is provided in the rotation-side raceway member which has a shaft, ring and a nut for fastening these components, by interposing between the nut and ring an annular body for making a rotor, or by forming a flange portion integrally with the nut. In the latter case, the stator is forced into the midportion of the rotation-side raceway member by a press fit, and the rotor is provided in the rotation-side raceway member which has a shaft, ring and a nut for fastening these components, for example, by shaping the outer periphery of the shaft in a specified form.

The resolver to be used can be any of various types of brushless resolvers or brushless synchronous resolvers, among which the VR-type (variable reactance type) resolver is preferred.

BEST MODE OF CARRYING OUT THE INVENTION

Embodiments of the invention will be described below with reference to the drawings.

Figure 1:
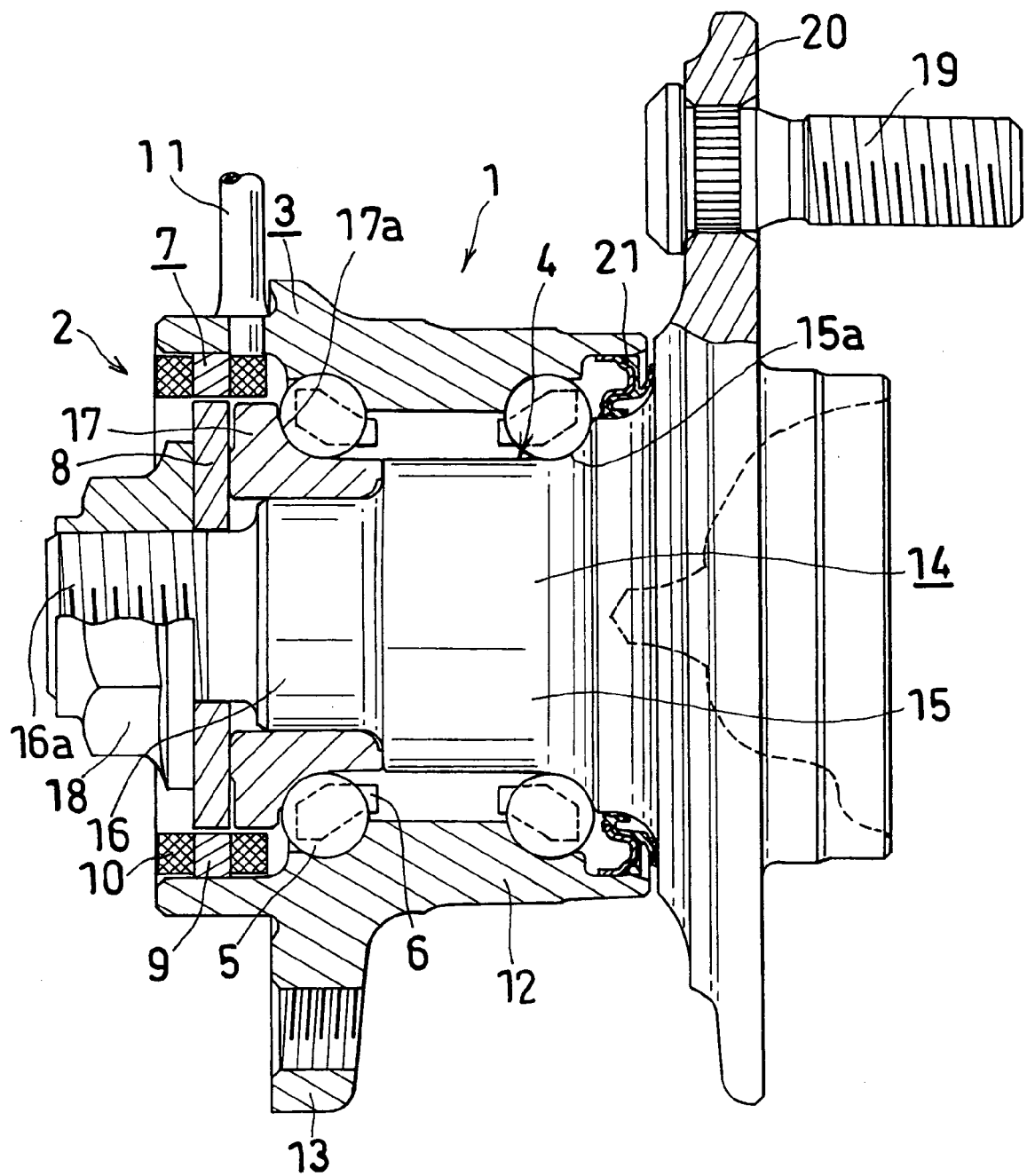
FIG. 1 is a view in vertical section showing a first embodiment of sensor-equipped hub unit according to the invention.
Figure 2:
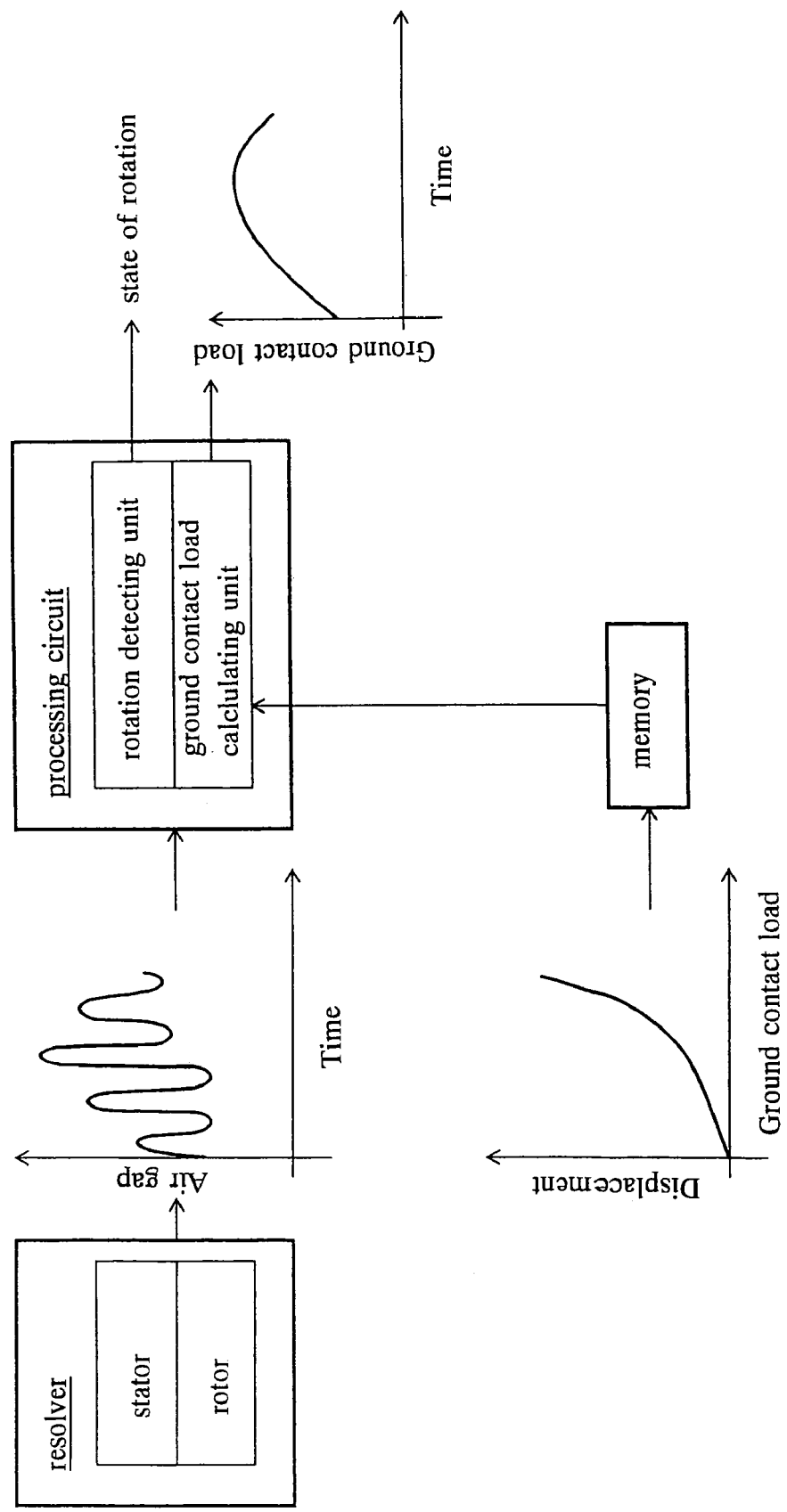
FIG. 2 is a block diagram of a sensor device of the sensor-equipped hub unit of the invention.

FIGS. 1 and 2 show a first embodiment of sensor-equipped hub unit of the invention. In the following description, the terms "left," "right," "upper" and "lower" refer respectively to the left- and right-hand sides and upper and lower sides of FIGS. 1, 3 and 4. In these drawings, the left-hand side is the inner side of the vehicle, and the right-hand side, the outer side of the vehicle.

As shown in FIG. 1, the sensor-equipped hub unit comprises a hub unit 1, and a resolver 2 serving as a sensor device for detecting the rotation thereof and ground contact loads.

The hub unit 1 comprises a stationary-side raceway member 3 fixed to a vehicle body, a rotation-side raceway member 4 to which a wheel is to be attached, balls 5 serving as rolling bodies arranged in two rows between the two members 3, 4, and retainers 6 for holding the balls 5 in the respective rows.

The stationary-side raceway member 3 has a hollow cylindrical portion 12 provided with two outer ring raceways on the inner periphery thereof, and a flange portion 13 provided in the vicinity of the left end of the cylindrical portion 12 and to be fastened with bolts to a suspension device (vehicle body).

The rotation-side raceway member 4 comprises a shaft 14 composed of a large-diameter portion 15 having a first raceway 15a, and a small-diameter portion 16 having an outside diameter smaller than the diameter of the first raceway 15a; a ring 17 fixedly fitted around the small-diameter portion 16 of the shaft 14 and having a right face in intimate contact with a left face of the large-diameter portion 15 of the shaft 14; and a nut 18 screwed on an externally threaded left end portion of small-diameter portion 16 of the shaft 14. The shaft 14 has a flange 20 positioned close to the right end thereof and fixedly provided with bolts 19 for attaching the wheel. The ring 17 has a raceway 17a in parallel to the raceway 15a of the shaft 15. A seal device 21 is provided between the right end of the stationary-side raceway member 3 and the shaft 15.

The resolver 2 is a VR-type brushless resolver, and comprises a stator 7 and a rotator 8. The stator 7 is provided in a left end portion of the stationary-side raceway member 3, and the rotor 8 is positioned, as opposed to the stator 7, on the rotation-side raceway member 4.

The stator 7 comprises an annular core 9 having a saw-toothed inner periphery, and a stator winding 10 formed by providing coils respectively on all teeth of the core 9. The stator 7 is fixed to the left end portion of the stationary-side raceway member 3 by a press fit, with the inner ends of the core teeth facing radially inward, whereby the inner periphery of the core 9 of the stator 7 is made concentric with the inner periphery of the stationary-side raceway member 3. The core 9 has an inside diameter slightly larger than the outside diameter of the ring 17. The stator 7 has attached thereto a signal line 11, through which variations in the voltage of the stator 7 are sent to a processing circuit.

The rotor 8 of the resolver 2 is in the form of an apertured disk, is fitted around the base end of the externally threaded portion 16a of the shaft small-diameter portion 16 so as to be in bearing contact with the left face of the ring 17, and is fastened to the rotation-side raceway member 4 by a nut 18 screwed on the externally threaded portion 16a. The rotor 8 is approximately equal to the ring 17 in outside diameter, whereby an air gap is provided between the rotor 8 and the stator 7 as required.

With the sensor-equipped hub unit described, variations in the ground contact load on the tire vary the displacement of the rotation-side raceway member 4 relative to the stationary-side raceway member 3, consequently varying the air gap between the stator 7 and the rotor 8 to be detected by the resolver 2. As shown in FIG. 2, variations in the air gap are output from the resolver 2 as variations in voltage. Data, such as angle of rotation or rotational speed, required, for example, for ABS is determined based on the output signal by a rotation detecting unit of the processing circuit for the resolver (sensor device). The processing circuit for the resolver further has a ground contact load calculating unit having calculation equations stored therein for calculating ground contact loads from displacement outputs as voltage variations. The calculating unit calculates the ground contact load, which is fed to vehicle control means to control the vehicle properly.

Figure 3:
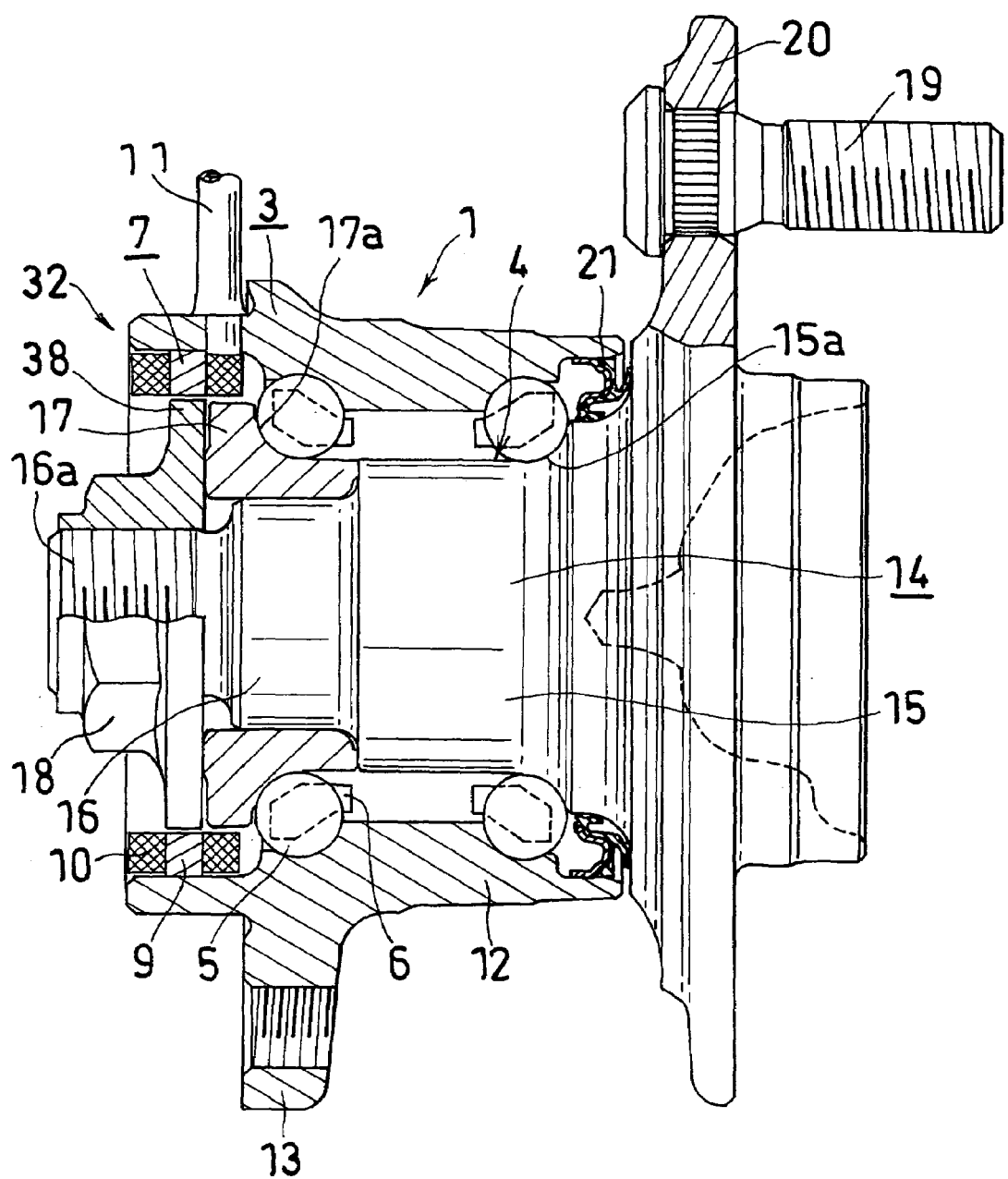
FIG. 3 is a view in vertical section showing a second embodiment of sensor-equipped hub unit according to the invention.

FIG. 3 shows a second embodiment of sensor-equipped hub unit according to the invention. In the following description, the terms "left," "right," "upper" and "lower" refer respectively to the left- and right-hand sides and upper and lower sides of FIG. 3.

The second embodiment differs from the first embodiment only in the construction of the resolver rotor and otherwise has the same construction as the first. Like parts are referred to by like reference numerals and will not be described repeatedly.

The sensor-equipped hub unit of the second embodiment has a resolver 32 which is a VR-type brushless resolver comprising a stator 7 and a rotor 38. The stator 7 is provided in a left end portion of the stationary-side raceway member 3, and the rotor 38 is positioned, as opposed to the stator 7, on the rotation-side raceway member 4.

The stator 7 comprises an annular core 9 having a saw-toothed inner periphery, and a stator winding 10 formed by providing coils respectively on all teeth of the core 9. The stator 7 is fixed to the left end portion of the stationary-side raceway member 3 by a press fit, with the inner ends of the core teeth facing radially inward, whereby the inner periphery of the core 9 of the stator 7 is made concentric with the inner periphery of the stationary-side raceway member 3. The core 9 has an inside diameter slightly larger than the outside diameter of the ring 17. The stator 7 has attached thereto a signal line 11, through which variations in the voltage of the stator 7 are sent to a processing circuit.

A nut 18 for holding the ring 17 in intimate contact with the left face of the large-diameter portion 15 of the shaft 14 has a flange portion which is shaped as specified, whereby the rotor 38 of the resolver 32 is provided. The rotor, i.e., the nut flange portion, 38 is approximately equal to the ring 17 in outside diameter, whereby an air gap is formed between the rotor 38 and the stator 7 as required.

With the sensor-equipped hub unit described, variations in the ground contact load on the tire vary the displacement of the rotation-side raceway member 4 relative to the stationary-side raceway member 3, consequently varying the air gap between the stator 7 and the rotor 38 to be detected by the resolver 32. As shown in FIG. 2, variations in the air gap are output from the resolver as variations in voltage. Data, such as angle of rotation or rotational speed, required, for example, for ABS is determined based on the output signal by a rotation detecting unit of the processing circuit for the resolver (sensor device). The processing circuit for the resolver further has a ground contact load calculating unit having calculation equations stored therein for calculating ground contact loads from displacement outputs as voltage variations. The calculating unit calculates the ground contact load, which is fed to vehicle control means to control the vehicle properly.

Figure 4:
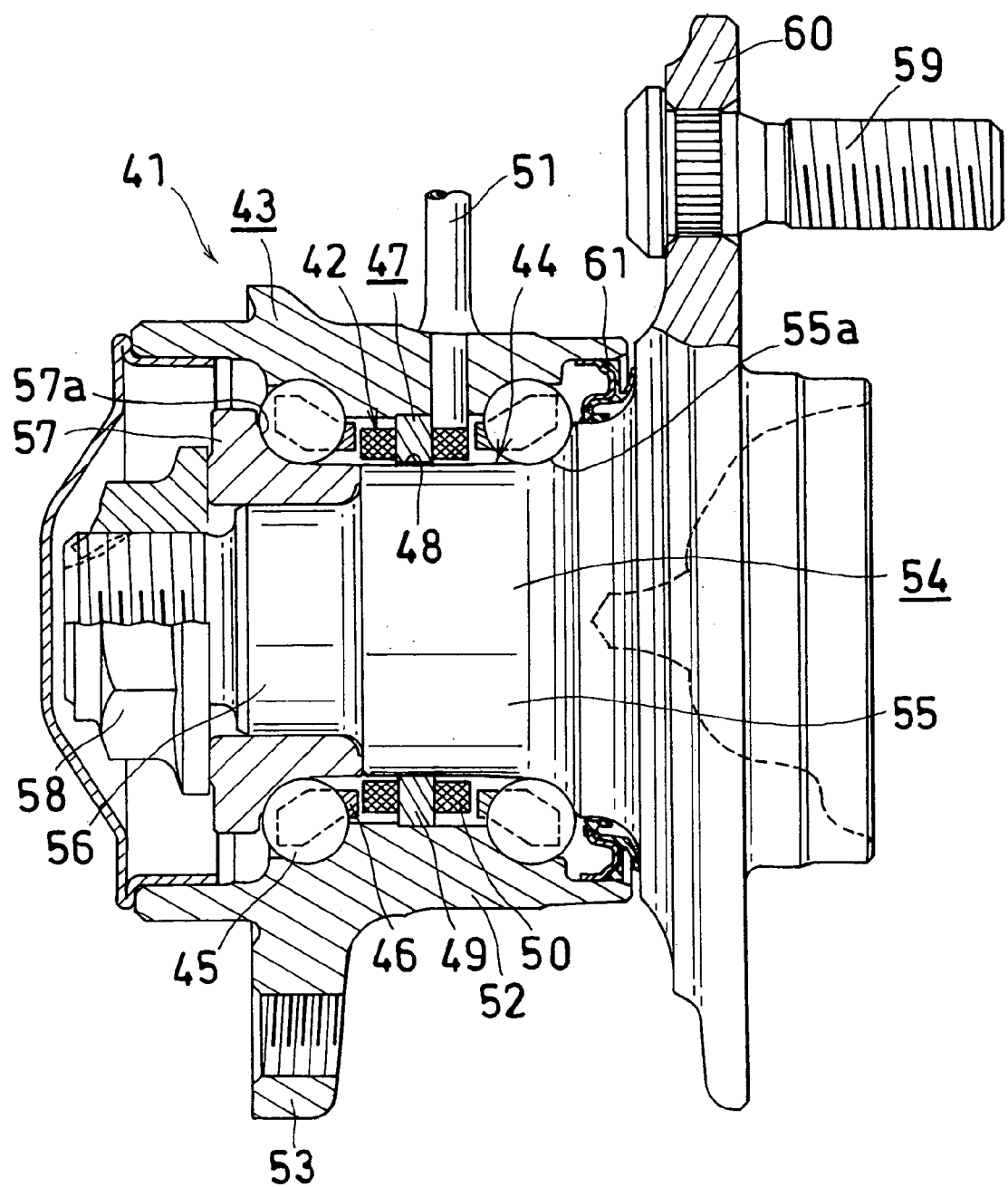
FIG. 4 is a view in vertical section showing a third embodiment of sensor-equipped hub unit according to the invention.

FIG. 4 shows a third embodiment of sensor-equipped hub unit according to the invention. In the following description, the terms "left,"[1] "right," "upper" and "lower" refer respectively to the left- and right-hand sides and upper and lower sides of FIG. 4.

As shown in FIG. 4, the sensor-equipped hub unit comprises a hub unit 41, and a resolver 42 serving as a sensor device for detecting the rotation thereof and ground contact loads.

The hub unit 41 comprises a stationary-side raceway member 43 to be fixed to a vehicle body, a rotation-side raceway member 44 to which a wheel is to be attached, balls 45 serving as rolling bodies arranged in two rows between the two members 43, 44, and retainers 76 for holding the balls 75 in the respective rows.

The stationary-side raceway member 43 has a hollow cylindrical portion 52 provided with two outer ring raceways on the inner periphery thereof, and a flange portion 53 provided in the vicinity of the left end of the cylindrical portion 52 and to be fastened with bolts to a suspension device (vehicle body). The rotation-side raceway member 44 comprises a shaft 54 composed of a large-diameter portion 55 having a first raceway 55a, and a small-diameter portion 56 having an outside diameter smaller than the diameter of the first raceway 55a; and a ring 57 fixedly fitted around the small-diameter portion 56 of the shaft 54. The shaft 54 has an externally threaded left end portion. A nut 58 is screwed on this externally threaded portion for holding the ring 57 in intimate contact with a left end face of the large-diameter portion 55 of the shaft 54. The shaft 54 has a flange 60 positioned close to the right end thereof and fixedly provided with bolts 59 for attaching the wheel. The ring 57 has a raceway 57a in parallel to the raceway 55a of the shaft 55. A seal device 61 is provided between the right end of the stationary-side raceway member 43 and the shaft 55.

The resolver 42 is a VR-type brushless resolver, and comprises a stator 47 and a rotator 48. The stator 47 is provided in the stationary-side raceway member 43, and the rotor 48 is provided on the rotation-side raceway member 44.

The stator 47 comprises an annular core 49 having a saw-toothed inner periphery, and a stator winding 50 formed by providing coils respectively on all teeth of the core 49. The stator 47 is fixed approximately to the axial midportion of the stationary-side raceway member 43 by a press fit, with the inner ends of the core teeth facing radially inward, whereby the inner periphery of the core 49 of the stator 47 is made concentric with the inner periphery of the stationary-side raceway member 43. The core 49 has an inside diameter slightly larger than the outside diameter of the large-diameter portion 55 of the shaft 54.

The rotor 48 of the resolver 42 is provided by machining the rotation-side raceway member 44 at the portion thereof opposed to the stator for use as a rotor. The stator 47 is positioned as opposed to a portion of the large-diameter portion 55 of the shaft 54 close to the left end thereof. The large-diameter portion of the shaft 54 is machined to form the portion to be used as the rotor.

With the sensor-equipped hub unit described, variations in the ground contact load on the tire alter the displacement of the rotation-side raceway member 44 relative to the stationary-side raceway member 43, consequently varying the air gap between the stator 47 and the rotor 48 to be detected by the resolver 42. As shown in FIG. 2, variations in the air gap are output from the resolver 42 as variations in voltage. Data, such as angle of rotation or rotational speed, required, for example, for ABS is determined based on the output signal by a rotation detecting unit of the processing circuit for the resolver (sensor device). The processing circuit for the resolver further has a ground contact load calculating unit having calculation equations stored therein for calculating ground contact loads from displacement outputs as voltage variations. The calculating unit calculates the ground contact load, which is fed to vehicle control means to control the vehicle properly.

The resolvers 2, 32, 42 are not limited to VR brushless resolvers, while the location where the resolver is to be installed is not limited to those of the foregoing embodiments.

INDUSTRIAL APPLICABILITY

When hub units serving as components of motor vehicles are replaced by the sensor-equipped hub unit of the invention, sensor devices for detecting various items of data as to the motor vehicle can be incorporated into hub units, whereby useful data is made available for controlling the motor vehicle to achieve improvements in the control of the vehicle.

The invention claimed is:

1. A sensor-equipped hub unit comprising a hub unit having a rotation-side raceway member to be provided with a wheel, a stationary-side raceway member to be fixed to a vehicle body and rolling bodies arranged between the two raceway members, and a sensor device mounted on the hub unit, the sensor-equipped hub unit being characterized in that the sensor device comprises a resolver composed of a rotor provided on the rotation-side raceway member and a stator provided on the stationary side raceway member, and a processing circuit for processing a signal to be output in accordance with an air gap between the stator and the rotor, the processing circuit having a wheel ground contact load calculating unit for determining the ground contact load on the wheel from the air gap between the stator and the rotor.

2. A sensor-equipped hub unit according to claim 1 wherein the processing circuit further has a rotation detecting unit for obtaining data as to the rotation of the wheel from the air gap between the stator and the rotor.

3. A sensor-equipped hub unit according to claim 1 wherein the stator comprises an annular core having a saw-toothed inner periphery, and a stator winding formed by providing coils respectively on all teeth of the core, the stator being fixed to an inner periphery of the stationary-side raceway member by a press fit with inner ends of teeth of the core facing radially inward.

4. A sensor-equipped hub unit according to claim 3 wherein the rotor is provided by machining the rotation-side raceway member at a portion thereof opposed to the stator for use as a rotor.

5. A sensor-equipped hub unit according to claim 3 wherein the rotor is provided by fittingly fixing an annular magnetic body having a cylindrical inner peripheral surface and a noncylindrical outer peripheral surface to the rotation-side raceway member at a portion thereof opposed to the stator.

6. A sensor-equipped hub unit according to claim 1 wherein the rotation-side raceway member comprises a shaft composes of a large-diameter portion having a first raceway and a small-diameter portion having an outside diameter smaller than the diameter of the first raceway, and a ring having a second raceway and fitted around the small-diameter portion of the shaft, the ring being fastened to the shaft with a nut screwed on an externally threaded end portion of the small-diameter portion of the shaft.

7. A sensor-equipped hub unit according to claim 6 wherein the resolver is provided at an end portion of the stationary-side raceway member, the stator being forced into an end portion of the rotation-side raceway member by a press fit, the rotor being formed by interposing between the nut and the ring an annular body providing a rotor.

8. A sensor-equipped hub unit according to claim 6 wherein the resolver is provided at an end portion of the stationary-side raceway member, the stator being forced into an end portion of the rotation-side raceway member by a press fit, the rotor being provided by forming a flange portion for making a rotor integrally with the nut.

9. A sensor-equipped hub unit according to claim 6 wherein the resolver is provided on the stationary-side raceway member at an intermediate portion thereof between two rows of rolling bodies, and the stator is forced into a midportion of the rotation-side raceway member by a press fit, the rotor being provided by shaping an outer periphery of the shaft of the rotation-side raceway member in a specified form.

10. A sensor-equipped hub unit according to claim 1 wherein the resolver is a VR-type resolver.

11. A sensor-equipped hub unit according to claim 1 wherein a surface of the rotor to be detected is in the form of a cylindrical surface which is eccentric with respect to a cylindrical surface centered about an axis of the hub unit.

12. A sensor-equipped hub unit according to claim 1 wherein a surface of the rotor to be detected is in the form of a cylindrical surface having a cutout.

* * * * *